May 6, 1958 H. T. KELSH 2,833,178
COMPENSATOR FOR PHOTOGRAMMETRIC PROJECTION INSTRUMENTS
Filed Dec. 24, 1956 4 Sheets-Sheet 1

INVENTOR.
HARRY T. KELSH
BY
Albert J Kramer
ATTORNEY

May 6, 1958  H. T. KELSH  2,833,178
COMPENSATOR FOR PHOTOGRAMMETRIC PROJECTION INSTRUMENTS
Filed Dec. 24, 1956  4 Sheets-Sheet 2

INVENTOR.
HARRY T. KELSH
BY
Albert J. Kramer
ATTORNEY

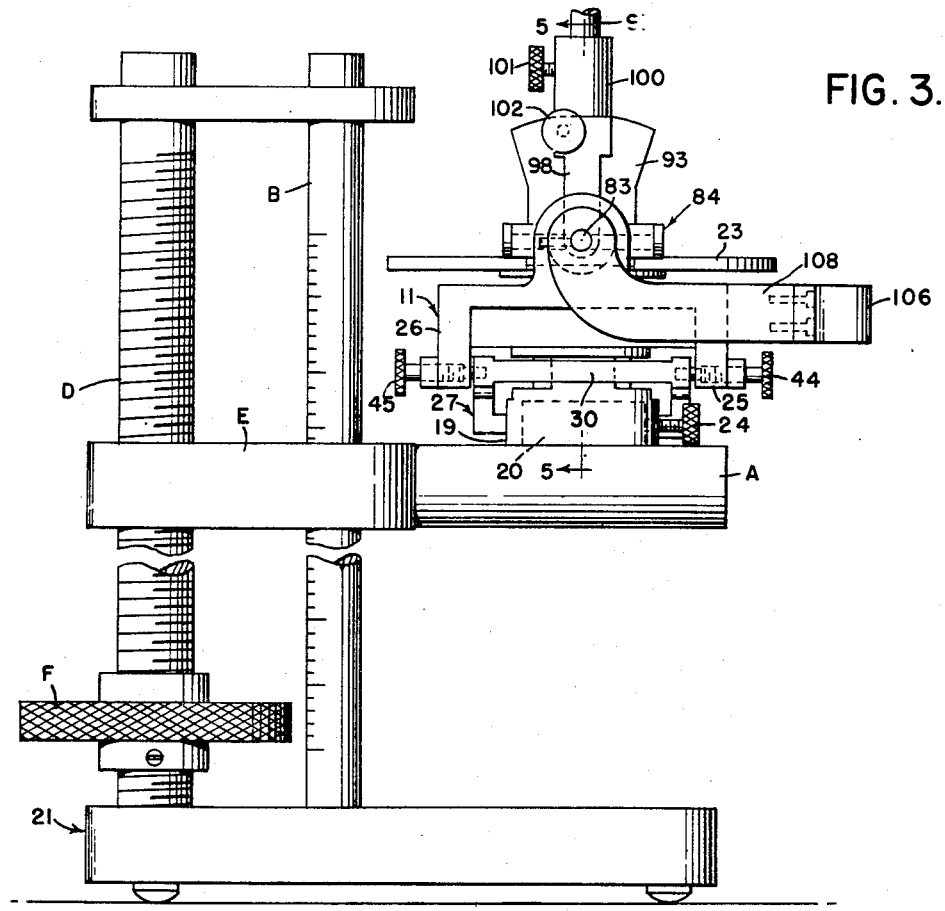
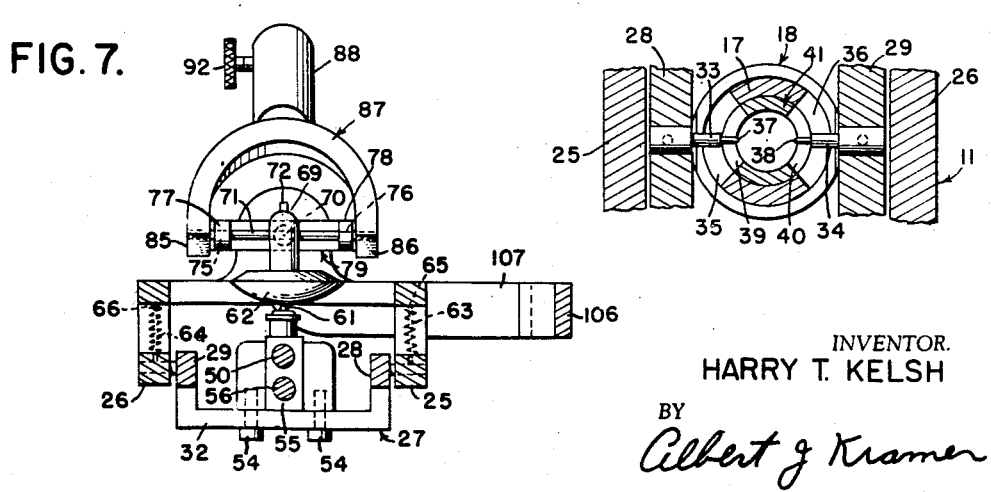

May 6, 1958        H. T. KELSH        2,833,178
COMPENSATOR FOR PHOTOGRAMMETRIC PROJECTION INSTRUMENTS
Filed Dec. 24, 1956        4 Sheets-Sheet 4

INVENTOR.
HARRY T. KELSH
BY
*Albert J. Kramer*
ATTORNEY

United States Patent Office 2,833,178
Patented May 6, 1958

2,833,178

COMPENSATOR FOR PHOTOGRAMMETRIC PROJECTION INSTRUMENTS

Harry T. Kelsh, Washington, D. C., assignor to The Kelsh Instrument Company, Inc., Baltimore, Md., a corporation of Maryland Application December 24, 1956, Serial No. 630,330

12 Claims. (Cl. 88—24)

This invention relates to compensating devices and it is more particularly concerned with such devices which are used in conjunction with photogrammetric projection instruments to compensate for earth curvature in making maps from stereoscopic pairs of high altitude aerial photographs (30,000 feet and up).

In my prior Patent No. 2,727,432, I have described compensating means for such a purpose and other purposes in conjunction with photogrammetric projection instruments of the type described in my prior Patents Nos. 2,451,031, 2,492,870 and 2,552,975, in which the correction is effected by moving those lenses through which light from the projectors are directed after passing through the photographic diapositives.

My present invention accomplishes a similar corrective function, by moving the floating mark of the mapping table, instead of the lenses. Each of these different corrective methods has certain advantages over the other. The present invention has the advantage that the device can be applied to an instrument which has already been built without in any way rebuilding it or the optical system thereof. Also, it can be readily removed when it is not needed (such as in aerial surveys below 30,000 feet where the effect of earth curvature is relatively negligible), and replaced when the need thereof arises again.

Another advantage of the present invention is its relatively simple construction and small cost of manufacture.

These and other advantages, features and objects of the invention will appear more fully from the following description, considered together with the accompanying drawing.

In the drawing:

Fig. 2 is a front elevational view of an embodiment of the invention combined with the tracing unit of the photogrammetric instrument, partly broken away.

Fig. 3 is a side elevational view of the same combination of parts shown in Fig. 2.

Fig. 6 is a sectional view along the line 6—6 of Fig. 2.

Fig. 7 is a sectional view along the line 7—7 of Fig. 2.

Fig. 8 is a sectional view along the line 8—8 of Fig. 6.

Figure 1:
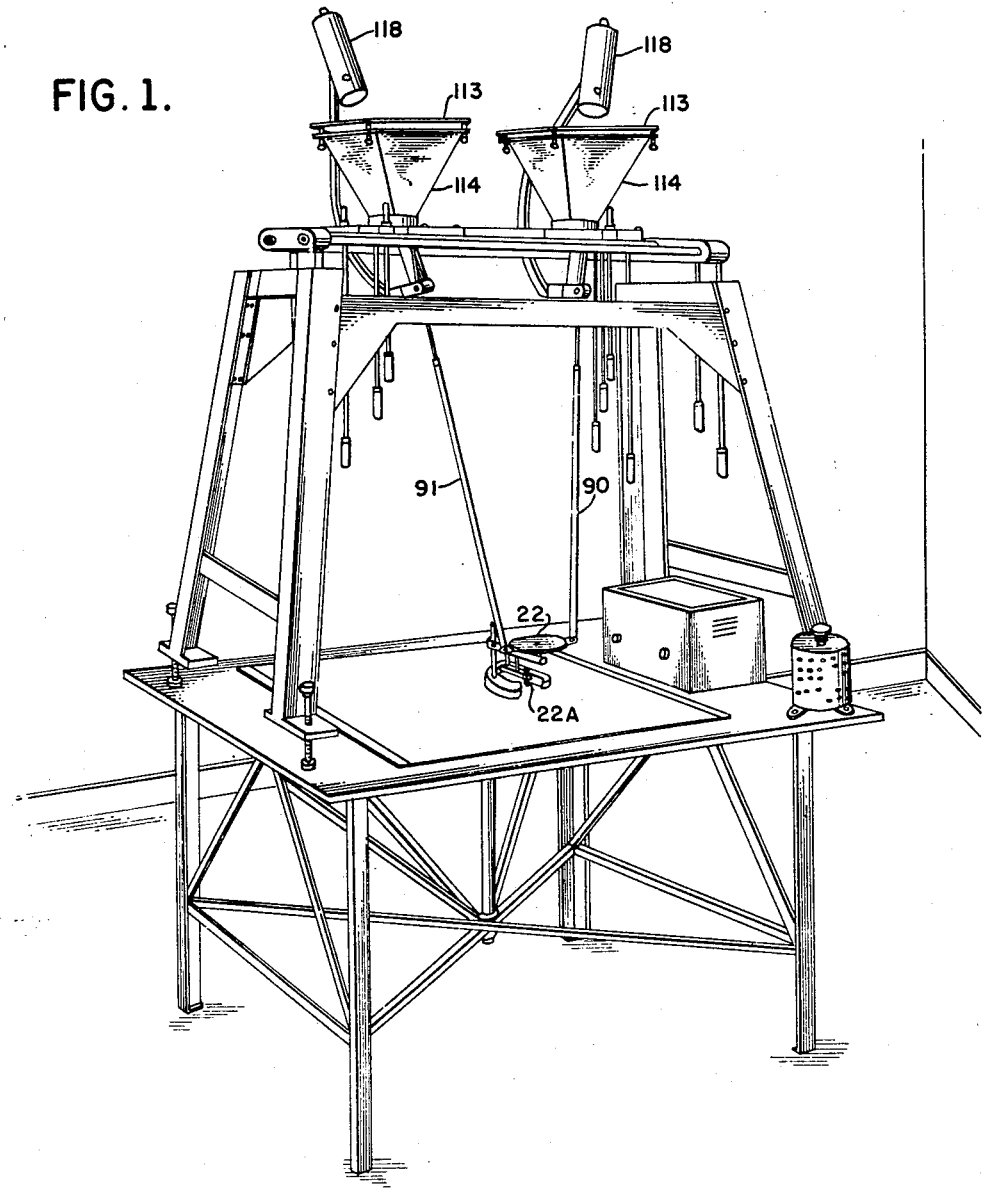
Fig. 1 is a perspective view of a stereoscopic photogrammetric projection instrument of a representative type to which the invention is adaptable.
Figure 4:
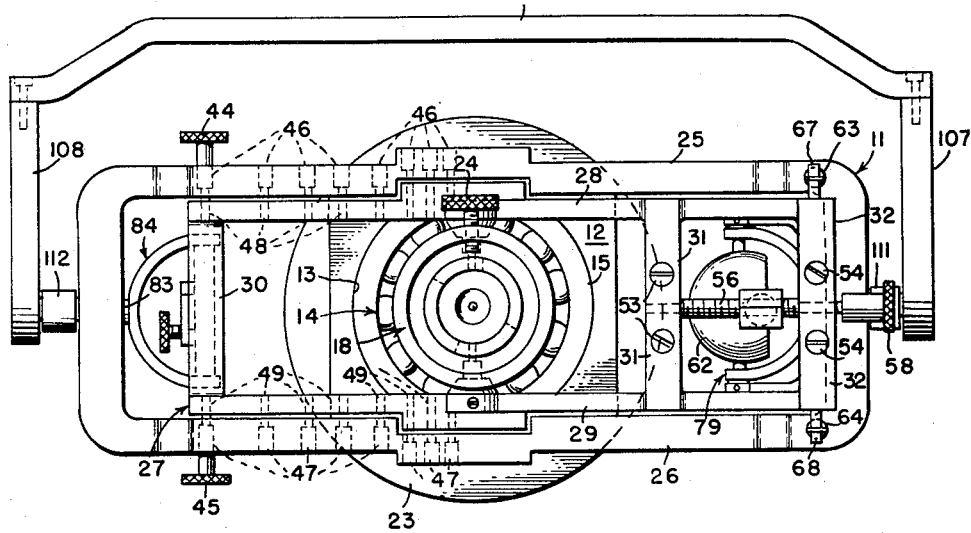
Fig. 4 is a bottom plan view of the embodiment apart from the tracing unit.

Referring with more particularity to the drawing in which like numerals designate like parts, the embodiment comprises an open frame or base structure 11, generally rectangular in shape, and which has a central block portion 12 provided with a vertical circular aperture 13 which forms a well for a ball bearing assembly 14. The latter comprises an outer race band 15 which is rigidly secured to the wall of the aperture 13 and an inner race band 16 which is firmly secured to an upper restricted portion 17 of a cylindrical socket 18. A lower portion 19 of the member is of somewhat larger diameter and it is positioned below the frame 11 to form a collar for engaging the platen post 20 of an ordinary tracing unit 21 from which its viewing platen 22 above a writing implement 22A (see Fig. 1) has been removed to expose the post 20, and in substitution of which a viewing platen 23 is provided. The collar or lower portion 19 is also provided with a set screw 24 for removably securing it to the post 20. This post being a part of an elevator A, vertically movable on posts B and C and which is moved by turning a mounted vertical shaft D that therewith engages a bracket E of the elevator A said shaft being turned by means of a knob F.

The frame 11 includes parallel front and rear longitudinal members 25 and 26. Between the members 25 and 26, there is disposed a generally rectangular beam 27 as a lever having a pair of longitudinal side bars 28 and 29 and cross bars 30, 31 and 32. Between the cross bars 30 and 31, there project inwardly from opposite points of side bars 28 and 29 diametrically adjacent the socket 18, pins 33 and 34 through arcuate slots 35 and 36, respectively, in the portion 17 of the member 18. The width of these slots are greater than the vertical thicknesses of the pins 33 and 34 to obtain a degree of relative vertical movement between these pins and the member 18. The tips 37 and 38 of these pins engage slots 39 and 40 in a cylindrical supporting member 41 set concentrically in the reduced portion 17 and having its upper end provided with an integral flange 42 to support the viewing platen 23. This flange 42 and platen 23 are secured together by screws 43 substantially as shown.

The beam 27 is fulcrumed to the frame members 25 and 26 at selected points by means of a pair of removable pivot screws 44 and 45 in one pair of a series of pairs of apertures 46, 47 through the frame members 25 and 26, respectively, and a matching pair of corresponding series of pairs of apertures 48, 48 in alignment therewith in the side bars 28 and 29, respectively, substantially as shown.

Between the cross bars 31 and 32, a slide bar 50 is slidably carried in bearing blocks 51 and 52 bolted to the cross bars with bolts 53 and 54 and it is rigidly connected to a block 55. The position of the slide block 55 and its bar 50 between the cross bars 31 and 32 is set by means of a lead screw 56 which is threadedly engaged with the block and pivotally held in the blocks 51 and 52. At one end of the lead screw 56, a shaft 57 projects outwardly from the bearing block 52 and it is provided with a knurled knob 58 for use in manually turning it. The corresponding end of the slide bar 50 passes through its bearing block 52 adjacent a scale plate 59 that is secured to the block 52. The scale plate has calibrated scale markings 60 in units of distance between the air stations of the flight survey of the aerial photographs being used to form the map being prepared.

The upper part of the block 55 carries a small abutment 61 or cam follower for contacting a convex cam 62, and it is resiliently urged in contact with the cam by means of a pair of coil springs 63 and 64. One end of each of these springs is connected to the frame 11 by anchor pins 65 and 66, respectively, and the other end to posts 67 and 68, respectively, on the beam 27.

The cam 62 is provided with a mounting post 69 which has an aperture 70 through which a shaft 71 passes. A set screw 72 on this post, permits clamping it in adjusted positions to the shaft 71.

The shaft 71 passes through and is free to rotate in apertures 75 and 76 of the arms 77 and 78 of a yoke 79. The stem 80 of the yoke is rotatably mounted in bearings 81 of the frame at one end thereof.

The opposite end of the frame has corresponding bearings 82 for the stem 83 of a similar yoke 84.

The ends of the shaft 71 project beyond the arms 77 and 78 and they are connected to the ends of the arms 85 and 86 of a linking yoke or stirrup 87. The shaft 71 is fixed against rotation relative to the arms 85 and 86, whereby a hinged movement of the yoke 79 causes the shaft 71 to rotate and thereby swing the cam 62 relative to the abutment 61.

The stem 88 of the yoke 87 has a socket 89 for receiving the lower end of one arm 90 of a pair of light projector guide arms 90 and 91 which form parts of the photogrammetric mapping instrument (see Fig. 1) with which the device of the present invention is adapted to be used. A set screw 92 may also be provided to hold the guide arm 90 securely in the socket, as may be necessary.

A plate 93 is hinged at its lower end to the arms 94 and 95 of the yoke 84 on pintles 96 and 97. An arm 98 has a lower end pivoted to one side of the plate 93 at a point along the hinge axis of the plate by means of a hinge pin 99. The other end of the arm 98 has a socket 100 with a set screw 101 to receive the second guide arm 91. A clamping screw 102 is provided to fix the arm 98 in selected pivoted positions relative to the plate 98 and a marker 103 carried by the socket 100 rides along the arcuate top edge 104 of the plate where a scale 105 is engraved to indicate adjustments of different angular positions of the arm relative to the plate. This adjustment is to change the relative positions of the ends of the guide arms 90 and 91 to establish parallelism of a line passing therethrough with the X-axis of the model, or flight stations, the direction of which under different flight conditions may not be parallel to the X-axis of the instrument.

The yoke stems 80 and 83 extend outwardly beyond their respective bearings 81 and 82, respectively and are connected to a longitudinal stabilizing bar 106 by means of end arms 107 and 108 with set screws 109 and 110, respectively. Adjustable spacers 111 and 112 are also provided on the stems 80 and 83 between the arms 107, 108 and their corresponding bearings 81, 82.

Figure 5:
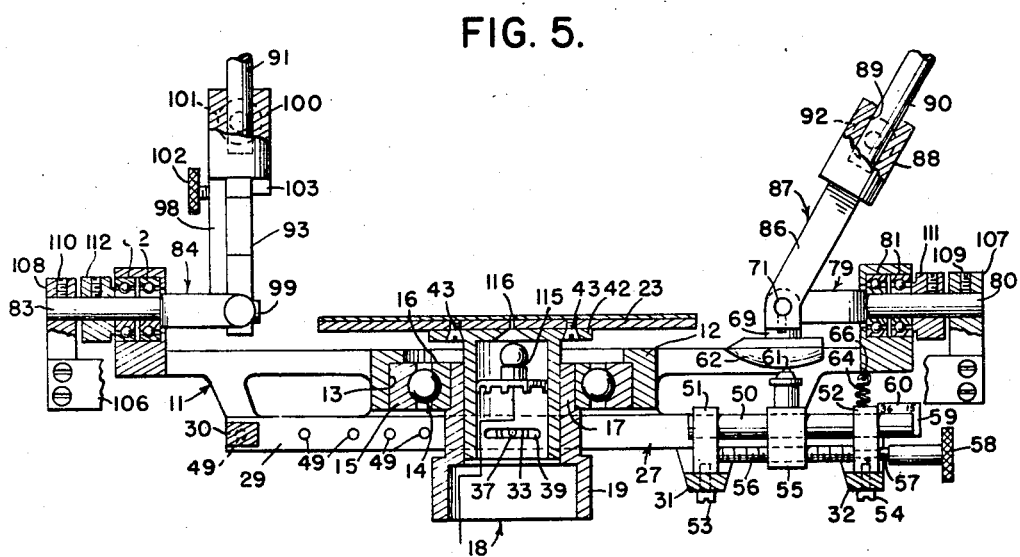
Fig. 5 is a longitudinal cross-sectional view along the line 5—5 of Fig. 3.

The device is used like the ordinary tracing unit 22 (see Figs. 2) with the pins 44 and 45 set in the proper apertures corresponding to the elevation of the aerial camera which took the photographs reproduced on the diapositives 113 mounted in the projection units 114 of the stereoscopic photogrammetric instrument, a calibrated scale 117 being provided to designate the proper aperture to use. With the guide arms 90 and 91 in place in the sockets 88 and 100 and the tracing unit set with the floating mark, which is formed by a light bulb 115 shining through a pin hole 116 at the center of the platen 23, the platen thus serving as a carrier for the floating mark, at about the center of the model being viewed by the operator, the knob 58 is turned to move the point 61 to the lowermost point of the cam 62. From this position the block 55 is then moved to the right, as viewed in Fig. 5, by again turning the knob 58, an amount to cause the floating mark to move vertically substantially the same amount when it is moved to the right or left of the center of the model, this being a function of the distance between photographic centers to which the scale 60 is calibrated. This places the point 61 eccentric of the cam 62 to the extent of the adjustment while the floating mark 116 is at the center of the model.

With the instrument thus set, the operator moves the tracing unit over the mapping table and the change of elevation of the floating mark 116 is automatically effected to compensate for the curvature of the earth. For example, if a given contour is being plotted, the operator by maintaining the floating mark in contact with the ground will automatically compensate for the earth's curvature. Without this correction factor, the contour line drawn would be in error to the extent of the earth's curvature involved in the area plotted.

As the mapping unit moves over the mapping surface, the weight of the light projectors 118 tend to move the ends of the guide arms 90 and 91 out of an alignment that is parallel to the longitudinal or X-axis of the model. The maintenance of this relation is necessary for proper operation of the mapping instrument and to do so, the bar 106 is provided, as explained above.

Having thus described my invention I claim:

1. A compensator for a stereoscopic photogrammetric projection instrument having a tracing unit, comprising a frame adapted to be carried on the tracing unit, said stereoscopic photogrammetric projection instrument having swinging light projectors and arms for swinging said projectors, a floating mark carrier mounted for vertical movement relative to the frame, means carried by the frame and attachable to a guide arm for automatically adjusting the elevation of the floating mark carrier relative to the frame in accordance with a predetermined pattern as the tracing unit moves horizontally.

2. In a stereoscopic photogrammetric projection instrument having a tracing unit, swinging light projectors and arms for swinging said projectors, an earth curvature compensator comprising a frame adapted to be carried on said tracing unit, a floating mark carrier mounted for constrained vertical movement relative to the frame, members carried by the frame for connecting it to the said guide arms, and means for automatically adjusting the elevation of the floating mark carrier relative to the frame in accordance with a predetermined pattern as the tracing unit moves horizontally when the said members are connected to said guide arms.

3. The combination with a stereoscopic photogrammetric projector having a tracing unit, swinging light projectors, and arms for swinging said projectors, of an earth curvature compensator comprising a frame carried on said tracing unit, a floating mark carrier mounted for vertical movement relative to the frame, members carried by the frame for connecting it to the said guide arms, and means for automatically adjusting the elevation of the floating mark carrier relative to the frame in accordance with a predetermined pattern as the tracing unit moves horizontally when the guide arms are connected to the frame.

4. A compensator for a stereoscopic photogrammetric projection unit, comprising a frame adapted to be carried on the tracing unit, said stereoscopic photogrammetric projection instrument having swinging light projectors and arms for swinging said projectors, a floating mark carrier mounted for vertical movement relative to the frame, means for connecting the guide arms to the unit, and means responsive to changes in the angular relation between one of the guide arms and the unit for automatically adjusting the elevational position of the carrier relative to the frame when the guide arms are connected to the unit.

5. In combination, a tracing unit for a stereoscopic photogrammetric projection instrument, a vertically movable floating mark carrier supported on said unit, means for connecting to the unit guide arms of a pair of swinging light projectors, and means responsive to angular changes of a guide arm relative to the unit for automatically varying the elevation of the carrier in accordance with a predetermined pattern when the guide arms are connected to the unit.

6. In combination, a tracing unit for a stereoscopic photogrammetric instrument, a vertically movable floating mark carrier supported on the unit, means for connecting to the unit guide arms of a pair of swinging light projectors, a cam swingably carried by the unit and connected to one of the guide arms for swinging movement therewith, and means responsive to swinging movements of the cam for automatically varying the elevation of the carrier on the unit.

7. In combination, a tracing unit for a stereoscopic photogrammetric instrument, said instrument having swingable light projectors and guide arms for swinging said projectors, said unit comprising a vertically movable floating mark carrier supported on the unit, means for connecting said guide arms to the unit, a cam swingingly carried by the unit and connected to one of the guide arms for swinging movement therewith, a cam follower mounted on said unit, a lever connected to the follower and pivoted to the unit, and means connecting the carrier to the lever for varying the elevation of the carrier as the lever pivotally moves under the influence of the cam.

8. The combination as defined by claim 7 having means for selectively changing the pivot axis between the lever and the unit.

9. The combination as defined by claim 7 in which the cam follower is adjustably connected to the lever, and means for adjusting the position of the cam on the lever.

10. The combination as defined by claim 7 and means for adjusting the position of the cam follower on the lever relative to the cam.

11. A compensator for a stereoscopic photogrammetric projection instrument having a tracing unit, comprising a frame structure adapted to be carried on the tracing unit of the stereoscopic photogrammetric projection instrument, a stereoscopic viewing platen, including a floating mark, mounted for vertical movement relative to said frame structure, a lever fulcrumed at one point to the frame along a first horizontal pivot axis and pivotally connected along a second horizontal axis parallel to the first horizontal pivot axis, to the platen at a second point, a cam follower carried by the lever at a third point, a pair of members swiveled to the frame on opposite sides of the platen, a pair of arms each having a rod connection means at one end and being pivoted to one of the swivel members at the other end, one of said rods having secured thereto a convex cam adjacent the cam follower, and means for constantly urging the cam follower in contact with the cam.

12. A tracing unit combination for a stereoscopic photogrammetric instrument and comprising a vertically movable floating mark carrier supported on the unit, and means for connecting said carrier to the guide arms of a pair of swinging light projectors, a cam swingingly carried by the tracing unit and connected to one of the guide arms for swinging movement therewith, a cam follower mounted on said unit, a lever connected to the cam follower and pivoted to the unit, and means connecting the carrier to the lever for varying the elevation of the carrier as the lever pivotally moves under the influence of the cam.

References Cited in the file of this patent

UNITED STATES PATENTS

| | | |
|---|---|---|
| 2,085,498 | Horner | June 29, 1937 |
| 2,451,031 | Kelsh | Oct. 12, 1948 |
| 2,492,870 | Kelsh | Dec. 27, 1949 |
| 2,552,975 | Kelsh | May 15, 1951 |
| 2,678,583 | Knapik | May 18, 1954 |
| 2,727,432 | Kelsh | Dec. 20, 1955 |
| 2,747,461 | Boughton et al. | May 29, 1956 |